United States Patent [19]

Batdorf

[11] Patent Number: 4,965,309

[45] Date of Patent: Oct. 23, 1990

[54] SMOKE SUPPRESSANT COMPOSITIONS FOR HALOGEN-CONTAINING PLASTICS AND METHODS OF USING

[75] Inventor: Vern H. Batdorf, Minneapolis, Minn.

[73] Assignee: H. B. Fuller Company, St. Paul, Minn.

[21] Appl. No.: 336,562

[22] Filed: Apr. 10, 1989

Related U.S. Application Data

[63] Continuation of Ser. No. 116,648, Nov. 4, 1987, abandoned.

[51] Int. Cl.$^5$ .................. C08K 3/24; C08K 3/32
[52] U.S. Cl. .................. 524/405; 524/406; 524/413; 524/417; 524/423; 524/424; 524/436; 524/437; 524/450; 524/451; 524/456
[58] Field of Search .......... 524/424, 413, 437, 436, 524/405, 432, 409, 411, 406, 450, 423, 456, 451, 417; 106/293, 294, 296, 292, 417, 426, 431, 483, 484; 252/609; 523/216, 217, 220, 223

[56] References Cited

U.S. PATENT DOCUMENTS

| | | | |
|---|---|---|---|
| 3,560,441 | 2/1971 | Schwarcz et al. | 524/405 |
| 3,821,151 | 6/1974 | Mitchell | 524/406 |
| 3,845,001 | 10/1974 | Mitchell | 524/406 |
| 3,900,441 | 8/1975 | King | 524/406 |
| 3,945,974 | 3/1976 | Schwarz et al. | 260/31.8 |
| 3,957,723 | 5/1976 | Lawson et al. | 260/45.75 |
| 3,965,068 | 6/1976 | Dickens, Jr. | 260/45.75 |
| 3,983,290 | 9/1976 | Elcik | 428/285 |
| 3,985,706 | 10/1976 | Kay | 260/45.75 |
| 3,996,142 | 12/1976 | White et al. | 252/8.1 |
| 4,052,350 | 10/1977 | Shiohara et al. | 524/456 |
| 4,053,451 | 10/1977 | Kroenke et al. | 524/413 |
| 4,055,537 | 10/1977 | Kroenke | 524/83 |
| 4,079,033 | 3/1978 | Oswitch et al. | 260/45.75 |
| 4,080,404 | 3/1978 | Deets | 524/406 |
| 4,096,116 | 6/1978 | Lawson | 260/45.75 |
| 4,097,432 | 6/1978 | Nichols | 524/315 |
| 4,104,233 | 8/1978 | Mathis et al. | 524/307 |
| 4,126,593 | 11/1978 | Takahashi | 524/451 |
| 4,129,535 | 12/1978 | Elcik | 524/143 |
| 4,147,690 | 4/1979 | Rich | 524/437 |
| 4,257,817 | 3/1981 | Mather et al. | 524/451 |
| 4,260,542 | 4/1981 | Joyce et al. | 524/123 |
| 4,267,089 | 5/1981 | Brown | 524/450 |
| 4,272,427 | 6/1981 | Davis et al. | 524/424 |
| 4,311,635 | 1/1982 | Pearson | 524/451 |
| 4,328,152 | 5/1982 | Tsigdinos et al. | 524/406 |
| 4,360,624 | 11/1982 | Huang et al. | 524/432 |
| 4,439,572 | 3/1984 | Kindrick | 524/432 |
| 4,464,495 | 8/1984 | Brown | 252/609 |
| 4,464,502 | 8/1974 | Jacobs | 524/411 |
| 4,507,414 | 3/1985 | McRowe et al. | 524/567 |
| 4,593,060 | 6/1986 | Gupta et al. | 524/397 |

FOREIGN PATENT DOCUMENTS

2236893 2/1975 France .
2028833 3/1980 United Kingdom .

OTHER PUBLICATIONS

Lally et al., Modern Plastics Encyclopedia, pp. 111, 112, 114, 116, 156 to 162 (Dec. 1949).

*Primary Examiner*—Veronica P. Hoke
*Attorney, Agent, or Firm*—Merchant, Gould, Smith, Edell, Welter & Schmidt

[57] ABSTRACT

A smoke suppressant additive for plastics capable of reducing the smoke development of the plastic without significantly effecting the appearance or integrity of the plastic, comprising: (i) about 1 to 8 parts zinc present as an inorganic compound, (ii) about 1 to 6 parts by weight magnesium present as an inorganic magnesium compound other than magnesium oxide, (iii) about 0.7 to 7 parts by weight molybdenum present as an inorganic molybdenum compound, and (iv) about 0 to 0.7 parts by weight copper present as an inorganic copper compound; all parts by weight based upon the total amount of the elements zinc, magnesium, molybdenum and copper in the composition.

Preferably, the smoke suppressant additive further comprises up to about 80 wt-% based upon the total weight of the composition, diluent.

The invention further comprises a method of incorporating a particulate flame retardant and/or smoke suppressant into a plastic, comprising the steps of: (i) physically attaching the active flame retardant and/or smoke suppressant onto a diluent without incurring any substantial chemical interaction between the retardant/suppressant and the diluent, and (ii) intimately admixing the physically coupled retardant/suppressant and diluent into the plastic.

26 Claims, No Drawings

SMOKE SUPPRESSANT COMPOSITIONS FOR HALOGEN-CONTAINING PLASTICS AND METHODS OF USING

This is a continuation of application Ser. No. 07/116,648, filed Nov. 4, 1987, now abandoned.

FIELD OF THE INVENTION

My invention relates to smoke suppressant additives for plastics. More specifically, my invention relates to metal containing smoke suppressant additives for chlorine containing plastics.

BACKGROUND OF THE INVENTION

Plastics have become a staple construction material in the construction of all types of buildings, from single-family homes and offices complexes to industrial and chemical plants. Concern over flammability of the plastics used in the construction has lead to the widespread use of halogenated plastics, such as polyvinyl chloride in the construction industry due to their comparatively low flammability. Further development has resulted in incorporation of a halogen into other plastics as a means for reducing their flammability.

More recently, the concern over increased use of plastics in the construction of dwellings and other structures has shifted from concern over flammability to concern over the amount of smoke generated by the plastics during combustion, particularly halogenated plastics which generate a comparatively high amount of smoke. These concerns have lead to building code standards for maximum flame spread/smoke development of 25/50 as measured by ASTM E-84, for plastics used in construction.

A number of smoke suppressant additives for plastics have been suggested.

King, U.S. Pat. No. 3,900,441, discloses a smoke suppressant composition for plastics comprising a mixture of a zinc compound, such as zinc oxide, and a molybdenum compound having the molybdenum ion in the 6+ valence state, such as sodium molybdate.

Schwarcz et al, U.S. Pat. No. 3,945,974, discloses a smoke suppressant composition for plastics comprising a zinc compound capable of producing zinc oxide during combustion.

Kay, U.S. Pat. No. 3,957,723, discloses a smoke suppressant composition for plastics comprising a mixture of aluminum oxide trihydrate and zinc oxide.

Dickens, U.S. Pat. No. 3,965,068, discloses a smoke suppressant composition for plastics comprising a mixture of a nickel compound and a zinc compound.

Elcik, U.S. Pat. No. 3,983,290, discloses a smoke suppressant composition for plastics comprising a mixture of magnesium hydroxide, zinc borate and antimony trioxide.

Kay, U.S. Pat. No. 3,985,706, discloses a smoke suppressant composition for plastics comprising a mixture of aluminum oxide trihydrate and zinc borate.

White et al, U.S. Pat. No. 3,996,142, discloses a smoke suppressant composition for plastics comprising the reaction product of magnesium oxide and a zinc salt and optionally an antimony compound.

Kroenke, U.S. Pat. No. 4,055,537, discloses a smoke suppressant composition for plastics comprising a mixture of a melamine molybdate or substituted melamine molybdate and at least one compound selected from the group consisting of molybdenum carbonate, zinc oxide, zinc borate, zinc silicate, and others.

Barr, U.S. Pat. No. 4,079,033, discloses a smoke suppressant composition for plastics comprising iron oxalate, zinc oxalate, zinc octoate, or mixtures thereof.

Deets, U.S. Pat. No. 4,080,404, discloses a smoke suppressant composition for plastics comprising dawsonite, magnesium, carbonate, ferric oxalate, zinc borate, zinc acetate or a mixture of zinc oxide and magnesium oxide.

Lawson, U.S. Pat. No. 4,096,116, discloses a smoke suppressant composition for plastics comprising a mixture of aluminum hydroxide and at least one of a cobalt, zinc, iron or manganese salt of hydroxycarboxylic or dicarboxylic acids.

Nichols, U.S. Pat. No. 4,097,432, discloses a smoke suppressant composition for plastics comprising a mixture of a specific organic compound and an oxide, hydroxide or salt of $Fe^{+++}$, $Zn^{++}$, or mixtures thereof.

Mathis, U.S. Pat. No. 4,104,233, discloses a smoke suppressant composition for plastics comprising omega-bromoalkyl esters of saturated aliphatic dicarboxylic acids and optionally an oxide, hydroxide, hydrate or salt of antimony, aluminum, calcium or magnesium.

Elcik, U.S. Pat. No. 4,129,535, discloses a smoke suppressant composition for plastics comprising a mixture of magnesium hydroxide, zinc borate, and antimony trioxide.

Joyce II et al, U.S. Pat. No. 4,260,542, discloses a smoke suppressant composition for plastics comprising the reaction product of one or more phosphorus compounds and certain metal oxides, metal salts, ammonia salts or silicon salts.

Davis et al, U.S. Pat. No. 4,272,427, discloses a smoke suppressant composition for plastics comprising a mixture of magnesium carbonate and zinc carbonate.

Huang et al, U.S. Pat. No. 4,360,624, discloses a smoke suppressant composition for plastics comprising a solid solution of zinc oxide and magnesium oxide and/or calcium oxide and/or an antimony compound.

Jacobs, U.S. Pat. No. 4,464,502, discloses a smoke suppressant composition for plastics comprising zinc oxide and optionally calcium carbonate or magnesium oxide.

Gupta, U.S. Pat. No. 4,593,060, discloses a smoke suppressant composition for plastics comprising tin or calcium oxalate and optionally zinc, magnesium or titanium oxide.

To my knowledge, none of the currently known smoke suppressants are capable of achieving the 25/50 ASTM E-84 class A standard without creating significant decomposition and/or coloration problems during processing or use.

Accordingly, a substantial need exists for an affordable smoke suppressant composition capable of reducing the smoke development of a plastic below the class A standard of 50, as measured by ASTM E-84, without significantly affecting the appearance or integrity of the plastic.

SUMMARY OF THE INVENTION

I have discovered (i) a smoke suppressing additive for plastics which can reduce the flame spread/smoke development of the plastic below 25/50, as measured by ASTM E-84, without significantly affecting the appearance or integrity of the plastic, and (ii) a method of incorporating a particulate flame retardant and/or smoke suppressant into a plastic so as to achieve optimum retarding and/or suppressing.

The smoke suppressant composition comprises (i) about 1-8 parts by weight zinc present as an inorganic zinc compound, (ii) about 1-6 parts by weight magnesium present as an inorganic magnesium compound other than magnesium oxide, (iii) about 0.7-7 parts by weight molybdenum present as an inorganic molybdenum compound, and (iv) about 0 to 0.7 parts by weight copper present as an inorganic copper compound; all parts by weight based upon the total amount of the elements zinc, magnesium, molybdenum and copper in the composition.

Preferably, the smoke suppressant composition further comprises up to about 80 wt-%, based upon the total weight of the composition, diluent as an aid in dispersing the zinc, magnesium, molybdenum and optional copper compounds throughout the plastic.

The method of incorporating a particulate flame retardant and/or smoke suppressant into a plastic comprises the steps of (i) physically attaching the active flame retardant and/or smoke suppressant, having an average particle size of less than about 20 microns, preferably less than about 5 microns, onto a diluent, having a particle size of less than about 50 microns, preferably less than about 10 microns, without incurring any substantial chemical interaction between the retardant/suppressant and the diluent; and (ii) intimately admixing the physically coupled retardant/suppressant and diluent into the plastic.

DETAILED DESCRIPTION OF THE INVENTION INCLUDING A BEST MODE

My smoke suppressant composition is capable of reducing the amount of smoke generated by most plastics during combustion below the class A standard of 50, as measured by ASTM E-84. My smoke suppressant composition comprises a synergistic mixture of about 1-8 parts by weight zinc present as an inorganic zinc compound, about 1-5.5 parts by weight magnesium present as an inorganic magnesium compound other than magnesium oxide, about 0.7-7 parts by weight molybdenum present as an inorganic molybdenum compound and about 0-0.7 parts by weight copper present as an inorganic copper compound; all parts by weight based upon the total amount of the elements zinc, magnesium, molybdenum and copper in the composition.

Preferably, my smoke suppressant composition includes up to 80 wt-% diluent, based upon the total weight of the composition.

In addition to acting as a smoke suppressant, I have surprisingly discovered that my smoke suppressant composition is capable of reducing the equilibrium torque necessary to extrude a plastic. Accordingly, when my smoke suppressant composition is incorporated into a plastic being extruded, not only will the smoke development of the resultant plastic item be reduced but the energy needed to mix the plastic into a homogeneous plastic state is reduced and the potential for thermal degradation of the plastic during processing is reduced.

Preferably, my smoke suppressant composition comprises about 1-3 parts by weight zinc, about 1-2.5 parts by weight magnesium, about 0.4-2.5 parts by weight molybdenum, and about 0-0.7 parts by weight copper; all parts by weight based upon the total amount of the elements zinc, magnesium, molybdenum and copper in the composition. Most preferably, my smoke suppressant composition comprises about 1-2 parts by weight zinc, about 1-2 parts by weight magnesium, about 0.4-0.8 parts by weight molybdenum and about 0-0.3 parts by weight copper; all parts by weight based upon the total amount of the elements zinc, magnesium, molybdenum and copper in the composition.

When a diluent is included my smoke suppressant composition preferably comprises about 1-3 parts by weight zinc compound, about 2-6 parts by weight magnesium compound, about 0.5-2 parts by weight molybdenum compound, about 0-0.5 parts by weight copper compound and about 3-11 parts by weight diluent; all parts by weight based upon the total weight of the composition. Most preferably, when taking the diluent into consideration, my smoke suppressant composition comprises about 1-1.7 parts by weight zinc compound, about 2-3.5 parts by weight magnesium compound, about 0.5-1.5 part by weight molybdenum compound, about 0-0.2 parts by weight copper compound and about 6-9 parts by weight diluent; all parts by weight based upon the composition.

The amount of smoke suppressant composition which should be added to a resin in order to achieve optimal reduction of smoke development with minimal adverse side effects depends upon several factors including the exact compositional makeup of the smoke suppressant composition, the type of resin, the processing parameters, etc. However, I have generally found that the optimal smoke suppression can be achieved by adding about 3 to 10 parts by weight zinc, magnesium, molybdenum, and copper compounds per 100 parts by weight resin.

A non-exclusive list of inorganic zinc compounds which may be employed in my smoke suppressant composition includes zinc oxide, zinc orthophosphate, zinc pyrophosphate, zinc carbonate, zinc borates, and mixtures thereof. Because of its low cost and ease of incorporation, into plastics, the preferred zinc compound is zinc oxide, zinc carbonate or a plastic mixture thereof.

The amount of zinc added to the resin should be carefully monitored as the zinc compounds tend to thermally degrade the plastic during processing if used in excess.

A nonexclusive list of magnesium compounds which may be employed in my smoke suppressant composition includes magnesium hydroxide, magnesium carbonate, magnesium phosphate, and mixtures thereof. Because of their low cost and ease of incorporation, the preferred magnesium compounds are magnesium hydroxide, magnesium carbonate, and mixtures thereof. Magnesium oxide is specifically excluded because I have discovered that magnesium oxide does not effect a decrease in smoke generation to the same degree as other magnesium compounds in my composition.

A nonexclusive list of molybdenum compounds which may be employed in my smoke suppressant composition includes any inorganic molybdenum compound wherein the molybdenum ion is present in the 6+ valence state such as molybdenum trioxide, ammonium octamolybdate, ammonium dimolybdate, etc. Because of its low cost and ease of incorporation into plastics, the preferred molybdenum compound is molybdenum trioxide, ammonium octamolybdate, and mixtures thereof.

The amount of the molybdenum compound incorporated into the plastic, like the zinc compound, must also be closely monitored as excessive molybdenum may thermally degrade the plastic during processing and/or discolor the plastic. A nonexhaustive list of copper compounds which may be employed in my smoke suppressant includes cupric oxide, cuprous oxide, copper pyrophosphate, copper borate, copper carbonate, copper oxalate and mixtures thereof. Because of its low cost and high effectiveness at suppressing the generation of smoke the preferred copper compound is cuprous oxide.

My smoke suppressant composition preferably includes a diluent as a dispersing aid for the active components. Useful diluents include talc, wollastonite, mica, feldspar, alkaline earth metal sulfates, alkali metal aluminum silicates, alkali metal carbonates, zinc silicates, and the like.

The preferred diluent depends upon several factors including the type and amounts of active components in the smoke suppressant composition, the type of resin and the processing parameters to which the resin and smoke suppressant composition will be subjected. Because of their low cost, ease of processing, and compatibility with the active smoke suppressant components and most resins under a variety of processing conditions, the preferred diluents are talc and wollastonite.

I have discovered that the particle size of the smoke suppressant composition is extremely important in achieving an optimum reduction in the generation of smoke. Small particle size and homogeneous dispersion of the smoke suppressant composition can dramatically increase the smoke suppressing ability of my smoke suppressant composition. Preferably the average particle size of the zinc compound is less than about 1 micron, the average particle size of the magnesium compound is less than about 15 microns, the average particle size of the molybdenum compound is less than about 5 microns and the average particle size of the copper compound is less than about 15 microns.

Most preferably, the average particle size of the zinc compound is less than about 0.2 microns, the average particle size of the magnesium compound is less than about 2 microns, the average particle size of the molybdenum compound is less than about 2.5 microns and the average particle size of the copper compound is less than about 12 microns.

Further, it is preferred that the average particle size of the diluent, when employed, be less than 15 microns and most preferably less than 10 microns.

While not intending to be limited hereby, I believe that the combination of a zinc compound, a magnesium compound, other than magnesium oxide, a molybdenum compound and optionally a copper compound synergistically act to form Lewis acids with liberated HCL to reduce the amount of benzene formed during burning of a plastic by catalyzing various competitive processes; benzene being the principle volatile compound formed during the early stages of pyrolysis of chlorinated plastics such as PVC and a major source of smoke development. I also believe that my composition promotes the formation of more readily oxidized aliphatic volatiles rather than smoke generating aromatic volatiles such as benzene. I further believe that my smoke suppressant composition promotes a char formation on the chlorinated plastic during combustion so as to inhibit further burning and smoke formation.

My smoke suppressant compositions appear to be most beneficial in suppressing the formation of smoke in halogenated plastics and in particular rigid PVC. However, I have also discovered that my smoke suppressant compositions can also reduce the amount of smoke generated by nonhalogenated plastics including elastomers.

My smoke suppressant composition may be employed in reacted or unreacted form. I have discovered that by chemically bonding the components of my smoke suppressant composition it is possible to decrease the amount of thermal degradation created by my smoke suppressant. However, when chemically bonded the smoke suppressing ability of my smoke suppressant composition tends to decrease as well. Accordingly, where increased stability is more important than increased smoke suppressant it may be desired to react the components of my smoke suppressant composition to achieve the desired stability despite a corresponding loss in smoke suppressant properties.

The components of my smoke suppressant composition may be chemically bonded by slurring the component in an appropriate solvent such as water and heating the slurry to about 150° to 200° F. for about 1 hour.

As stated previously, the smoke suppressing ability of my smoke suppressant composition may be dramatically increased by ensuring a small particle size and a thorough distribution of the smoke suppressant composition throughout the plastic. Accordingly, I have discovered that optimum smoke suppressing properties may be achieved by impounding the zinc, molybdenum, magnesium and copper components of my smoke suppressant composition onto a diluent prior to incorporation of the composition into the plastic.

A suggested method of impounding the zinc, magnesium, molybdenum and copper components onto the diluent is to simultaneously place all components, including the diluent, into a mill and milling the composition until the desired particle size and coupling is attained. I have discovered that the zinc, magnesium, molybdenum and copper compounds tend to physically adhere to the surface of the diluent thereby increasing the proximity of the synergistic mixture of zinc, magnesium, molybdenum and copper and aiding in a thorough distribution of the metal components of the composition throughout the plastic.

For reasons of cost, color retention of the composition and availability the preferred mill is a tumbler mill such as a pebble mill.

To assess the smoke suppressing properties of my smoke suppressant composition, ASTM E-906-83 Heat and Visible Smoke Release Rates for Materials and Products: ASTM E-84- 84 Surface Burning Characteristics of Building Materials; and ASTM 2863-77 Measuring the Minimum Oxygen Concentration to Support Candle-light Combustion of Plastics (Oxygen Index) are employed. ASTM E-84-84 is the standard test employed by the building codes to assess performance.

EXAMPLE I (PVC Resin)

The composition of the PVC resin employed in the examples is set forth below.

| Component | Parts by Weight |
|---|---|
| PVC resin | 95.0 |
| Organotin heat stabilizer | 1.4 |
| Impact modifier | |
| WACKER K-550 | 10.0 |
| Processing aids | |
| Rohm and Haas K-120ND | 2.0 |
| Lubricants | |

-continued

| Component | Parts by Weight |
| --- | --- |
| LOXIAL G-71 | 0.5 |
| LOXIAL G-30 | 0.2 |
| Epoxidized Soya Oil | 1.0 |
| Calcium Stearate | 1.0 |
| Titanium Dioxide | 10.0 |
| Parrafin Wax | |
| XL 165 | 2.5 |
| Hydrated Alumina | 39.0 |

EXAMPLE II (Base)

A 6"×6" 100 mil sample of the PVC of Example I, without flame retardant or smoke suppressant, was tested in accordance with ASTM E-906 (vertically mounted, piloted and with a radiant heat flux to specimen of 6 W/cm$^2$) and found to have a total smoke release of 20,875 parts/ft2.

EXAMPLE III (Smoke Suppressant)

Into a pebble mill was placed 6.9 parts by weight wollastonite (NYAD 475), 0.82 parts by weight zinc oxide (KADOX 15), 0.08 parts by weight zinc stearate, 0.08 parts by weight zinc pyrophosphate, 1.7 parts by weight magnesium hydroxide having a particle size of about 1.7 to 2.4 microns, and 0.41 parts by weight undensified, technical grade molybdenum trioxide having an average particle size of 2 microns. The mixture was pebble milled for four hours. 5.8 parts by weight of the milled mixture was incorporated into 94.2 parts by weight of the PVC resin of Example I in a torque rheometer manufactured by C. W. Brabender. The PVC/smoke suppressant composition was hot pressed at 370 to 380° F. for six minutes into a 6"×6"×100 mil sample. The sample was tested in accordance with ASTM E-906 (vertically mounted, piloted and with a radiant heat flux to specimen of 6 W/cm$^2$) and found to have a total smoke release of 7,336 parts/ft2.

EXAMPLE IV (Impounded)

Into a pebble mill was placed 6.0 parts by weight wollastonite (NYAD 475), 1 part by weight zinc oxide (KADOX 15), 1 part by weight zinc carbonate, 0.01 parts by weight zinc stearate, 3.0 parts by weight magnesium hydroxide having a particle size of 1.7 to 2.4 microns, and 1 parts by weight light magnesium carbonate. The mixture was pebble milled for 0.5 hours. 5.8 parts by weight of the milled mixture was incorporated into 94.2 parts by weight of the PVC resin of Example I in a torque rheometer, manufactured by C. W. Brabender. The PVC/smoke suppressant composition was hot pressed at 370° to 380° F. for six minutes into a 6"×6"×100 mil sample. The sample was tested in accordance with ASTM E-906 (vertically mounted, piloted and with a radiant heat flux to specimen of 6 W/cm$^2$) and found to have a total smoke release of 7,358 parts/foot$^2$.

EXAMPLE V (Impounded)

Into a pebble mill was placed 6.0 parts by weight wollastonite (NYAD 475), 1 part by weight zinc oxide (KADOX 15), 1 part by weight zinc carbonate, 0.01 parts by weight zinc stearate, 3.0 parts by weight magnesium hydroxide having a particle size of 1.7 to 2.4 microns, and 1 parts by weight light magnesium carbonate. The mixture was pebble milled for 2 hours. 5.8 parts by weight of the milled mixture was incorporated into 94.2 parts by weight of the PVC resin of Example I in a torque rheometer, manufactured by C. W. Brabender. The PVC/smoke suppressant composition was hot pressed at 370° to 380° F. for six minutes into 6"×6"×100 mil sample. The sample was tested in accordance with ASTM E-906 (vertically mounted, piloted and with radiant heat flux to specimen of 6 W/cm$^2$) and found to have a total smoke release of 9,018 parts/foot$^2$.

EXAMPLE VI

Into a pebble mill was placed 6.0 parts by weight wollastonite (NYAD 475), 1 part by weight zinc oxide (KADOX 15), 1 part by weight zinc carbonate, 0.01 parts by weight zinc stearate, 3.0 parts by weight magnesium hydroxide having a particle size of 1.7 to 2.4 microns, and 1 parts by weight light magnesium carbonate. The mixture was pebble milled for 6 hours. 5.8 parts by weight of the milled mixture was incorporated into 94.2 parts by weight of the PVC resin of Example I in a torque rheometer, manufactured by C. W. Brabender. The PVC/smoke suppressant composition was hot pressed at 370° to 380° F. for six minutes into 6"×6"×100 mil sample. The sample was tested in accordance with ASTM E-906 (vertically mounted, piloted and with radiant heat flux to specimen of 6 W/cm2) and found to have a total smoke release of 7,247 parts/foot$^2$.

The specification and Examples above are presented to aid in a complete, nonlimiting understanding of the invention. Since many variations and embodiments of the invention can be made without departing from the spirit and scope of the invention, the invention resides in the claims hereinafter appended.

I claim:

1. A polymeric rigid polyvinyl chloride resin composition comprising:
   (a) a major proportion of a rigid polyvinyl chloride; and
   (b) a smoke suppressant composition comprising:
      (i) an effective smoke suppressing amount up to about 80 parts by weight of a diluent selected from the group consisting of talc, wollastonite, mica, feldspar, an alkaline earth sulfate, an alkali metal aluminum silicate, an alkali metal carbonate, a zinc sulfate or mixtures thereof;
      (ii) about 1 to 8 parts by weight of zinc in the form of an inorganic zinc compound;
      (iii) about 1 to 6 parts by weight of magnesium in the form of an inorganic magnesium compound other than magnesium oxide; and
      (iv) about 0.7 to 7 parts by weight of molybdenum in the form of an inorganic molybdenum compound;
   all parts be weight based upon the total amount of smoke suppressant; wherein the zinc compound, magnesium compound and molybdenum compound are incorporated onto the surface of the talc.

2. The polymeric resin composition of claim 1 further comprising about 0.1 to 0.7 parts by weight copper in the form of an inorganic copper compound.

3. The polymeric resin composition of claim 1 comprising about 1 to 3 parts by weight zinc in the form of a zinc compound, about 1 to 3 parts by weight magnesium in the form of a magnesium compound, and about 0.4 to 2.5 parts by weight molybdenum in the form of a molybdenum compound.

4. The polymeric resin composition of claim 1 comprising about 1 to 2 parts by weight zinc in the form of a zinc compound, about 1 to 2 parts by weight magnesium in the form of a magnesium compound, and about 0.4 to 0.8 parts by weight molybdenum in the form of a molybdenum compound.

5. The polymeric resin composition of claim 2 comprising about 1 to 3 parts by weight zinc in the form of a zinc compound, about 1 to 3 parts by weight magnesium in the form of a magnesium compound, about 0.4 to 2.5 parts by weight molybdenum in the form of a molybdenum compound and about 0.1 to 0.7 parts by weight copper in the form of a copper compound.

6. The polymeric resin composition of claim 1 comprising about 1 to 2 parts by weight zinc in the form of a zinc compound, about 1 to 2 parts by weight magnesium in the form of a magnesium compound, about 0.4 to 0.8 parts by weight molybdenum in the form of a molybdenum compound, and about 0.1 to 0.3 parts by weight copper in the form of a copper compound.

7. The polymeric resin composition of claim 1 comprising about 1 to 3 parts by weight zinc in the form of a zinc compound, about 2 to 6 parts by weight magnesium in the form of a magnesium compound, about 0.5 to 2 parts by weight molybdenum in the form of a molybdenum compound, and about 3 to 11 parts by weight diluent.

8. The polymeric resin composition of claim 1, comprising about 1 to 1.7 parts by weight zinc in the form of a zinc compound, about 2 to 3.5 parts by weight magnesium in the form of a magnesium compound, about 0.5 to 1.5 parts by weight molybdenum in the form of a molybdenum compound, and about 6 to 9 parts by weight diluent; all parts by weight based upon the total weight of the composition.

9. The polymeric resin composition of claim 1, comprising about 1 to 1.7 parts by weight zinc in the form of a zinc compound, about 2 to 3.5 parts by weight magnesium in the form of a magnesium compound, about 0.5 to 1.5 parts by weight molybdenum in the form of a molybdenum compound, about 0.1 to 0.2 parts by weight copper in the form of a copper compound, and about 6 to 9 parts by weight diluent; all parts by weight based upon the total weight of the composition.

10. The polymeric resin composition of claim 1 wherein, the zinc is present as zinc oxide, zinc orthophosphate, zinc pyrophosphate, zinc carbonate, a zinc borate, or mixtures thereof.

11. The polymeric resin of claim 1, wherein the magnesium is present as magnesium hydroxide, magnesium carbonate, magnesium phosphate or mixtures thereof.

12. The polymeric resin composition of claim 1, wherein the molybdenum is present in the 6+ valence state.

13. The polymeric resin of claim 1, wherein the copper compound is present as cuprous oxide, cupric oxide, copper pyrophosphate, copper borate, copper carbonate, copper oxalate, or mixtures thereof.

14. The polymeric resin composition of claim 1, wherein the zinc compound has an average particle size of less than about 1 micron, the magnesium compound has an average particle size of less than about 15 microns, and the molybdenum compound has an average particle size of less than about 5 microns.

15. The polymeric resin of claim 3 wherein the zinc compound has an average particle size of less than about 0.2 micron, the magnesium compound has an average particle size of less than about 2 microns, and the molybdenum compound has an average particle size of less than about 2.5 microns.

16. The polymeric resin composition of claim 1, wherein the zinc compound has an average particle size of less than about 1 micron, the magnesium compound has an average particle size of less than about 15 microns, the molybdenum compound has an average particle size of less than about 5 microns and the copper compound has an average particle size less than about 15 microns.

17. The polymeric resin composition of claim 1, wherein the zinc compound has an average particle size of less than about 1 micron, the magnesium compound has an average particle size of less than about 15 microns, the molybdenum compound has an average particle size of less than about 5 microns, and the diluent has an average particle size of less than about 15 microns.

18. The polymeric resin composition of claim 1, wherein the zinc compound has an average particle size of less than about 0.2 micron, the magnesium compound has an average particle size of less than about 2 microns, the molybdenum compound has an average particle size of less than about 2.5 microns, and the diluent has an average particle size of less than about 10 microns.

19. The polymeric resin composition of claim 1, wherein the zinc compound has an average particle size of less than about 0.2 micron, the magnesium compound has an average particle size of less than about 2 microns, the molybdenum compound has an average particle size of less than about 2.5 microns, the copper compound has a particle size of less than about 12 microns, and the diluent has an average particle size of less than about 10 microns.

20. A method of incorporating a particulate smoke suppressant composition into a rigid polyvinyl chloride plastic in order to suppress the generation of flames and smoke by the plastic during combustion comprising the steps of:
 (a) physically attaching a smoke suppressant comprising:
  (i) an effective smoke suppressing amount up to about 80 parts by weight of a diluent having a particle size of less than about 50 microns selected from the group consisting of talc, wollastonite, mica, feldspar, an alkaline earth sulfate, an alkali metal aluminum silicate, an alkali metal carbonate, a zinc sulfate or mixtures thereof;
  (ii) about 1 to 8 parts by weight of zinc in the form of an inorganic zinc compound;
  (iii) about 1 to 6 parts by weight of magnesium in the form of an inorganic magnesium compound other than magnesium oxide; and
  (iv) about 0.7 to 7 parts by weight of molybdenum in the form of an inorganic molybdenum compound; all parts by weight based upon the total amount of smoke suppressant; wherein the zinc compound, magnesium compound and molybdenum compound have a particle size of less than about 20 microns and are incorporated onto the surface of the talc; and
 (b) intimately admixing the physically coupled suppressant and diluent into a plastic, the plastic requiring a lower equilibrium torque in an extrusion process than the same plastic without the smoke suppressant.

21. A method of retarding the flammability of the generation of smoke by a rigid polyvinyl chloride resin, comprising the steps of:
 (a) milling an active smoke retardant component comprising an inorganic zinc compound, an inorganic magnesium compound other than magnesium oxide and an inorganic molybdenum compound to less than about 5 microns;
 (b) milling a diluent to less than about 10 microns;
 (c) physically coupling the active component and the diluent; and
 (d) intimately admixing the physically coupled active smoke retardant component and diluent into a rigid polyvinyl chloride resin, the plastic without the smoke suppressant.

22. The method of claim 20, wherein the zinc compound has an average particle size of less than about 0.2 micron, the magnesium compound has an average particle size of less than about 2 microns, the molybdenum compound has an average particle size of less than about 2.5 microns, the copper compound has an average particle size of less than about 12 microns and the diluent has an average particle size of less than about 10 microns.

23. The method of claim 20, wherein the suppressant is physically attached to the diluent by simultaneously impounding the suppressant and the diluent in a mill.

24. The method of claim 23 wherein the mill is a tumbler mill.

25. The method of claim 24 wherein the tumbler mill is a ball mill.

26. A method of incorporating a particulate smoke suppressant composition into a rigid polyvinyl chloride plastic, the method comprising:
 (I) impounding:
  (a) about 1 to 8 parts by weight zinc in the form of an inorganic zinc compound;
  (b) about 1 to 6 parts by weight magnesium in the form of an inorganic magnesium compound other than magnesium oxide; and
  (c) about 0.07 to 7 parts by weight molybdenum in the form of an inorganic molybdenum compound; onto a diluent having a particle size of less than about 50 microns selected from the group consisting of talc, wollastonite, mica, feldspar, an alkaline earth sulfate, an alkali metal aluminum silicate, and alkali metal carbonate, a zinc sulfate and mixtures thereof; and
 (II) intimately admixing the inorganic impounded diluent into a rigid polyvinyl chloride plastic having a lower equilibrium torque than the same plastic without the smoke suppressant.

* * * * *